(12) United States Patent
Ceric et al.

(10) Patent No.: US 8,635,876 B2
(45) Date of Patent: Jan. 28, 2014

(54) GAS TURBINE FOR A THERMAL POWER PLANT, AND METHOD FOR OPERATING SUCH A GAS TURBINE

(75) Inventors: Hajrudin Ceric, Oberhausen (DE); Stefan Dahlke, Mülheim a.d. Ruhr (DE); Uwe Gruschka, Kaarst (DE); Matthias Heue, Bochum (DE); Martin Lenze, Essen (DE); Thomas Matern, Oberhausen (DE); Dieter Minninger, Dinslaken (DE); Axel Schaberg, Oelde (DE); Stephan Schmidt, Essen (DE); Steffen Skreba, Neunkirchen am Brand (DE); Bernd Stöcker, Oberhausen (DE); Volker Vosberg, Mülheim an der Ruhr (DE); Roger Waldinger, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 1050 days.

(21) Appl. No.: 12/225,147

(22) PCT Filed: Feb. 28, 2007

(86) PCT No.: PCT/EP2007/051907
§ 371 (c)(1),
(2), (4) Date: Aug. 21, 2009

(87) PCT Pub. No.: WO2007/104647
PCT Pub. Date: Sep. 20, 2007

(65) Prior Publication Data
US 2009/0293491 A1 Dec. 3, 2009

(30) Foreign Application Priority Data

Mar. 15, 2006 (EP) .................................... 06005331

(51) Int. Cl.
*F02C 7/00* (2006.01)
(52) U.S. Cl.
USPC ................. 60/779; 60/772; 60/773
(58) Field of Classification Search
USPC ............ 60/39.23, 778, 772, 779; 415/1, 148, 415/149.2, 151, 159
See application file for complete search history.

(56) References Cited

U.S. PATENT DOCUMENTS

| | | | | |
|---|---|---|---|---|
| 3,280,555 A | * | 10/1966 | Georges-Francois et al. | .. 60/794 |
| 4,094,142 A | * | 6/1978 | Pfefferle | ......................... 60/773 |
| 4,161,103 A | * | 7/1979 | Horgan et al. | ............... 60/39.35 |
| 5,966,925 A | * | 10/1999 | Torikai et al. | ................... 60/778 |
| 6,543,234 B2 | * | 4/2003 | Anand et al. | .................... 60/772 |

(Continued)

FOREIGN PATENT DOCUMENTS

| | | |
|---|---|---|
| EP | 0 508 067 A1 | 10/1992 |
| EP | 1 647 673 A1 | 4/2006 |
| GB | 1 171 495 | 11/1969 |

*Primary Examiner* — William H Rodriguez
*Assistant Examiner* — Scott Walthour

(57) ABSTRACT

Disclosed is a gas turbine for a thermal power plant, especially a gas turbine, comprising a rotatable rotor and a duct which can be penetrated by a gas and in which turbine blades for driving the rotor are disposed. The inventive gas turbine is characterized by a blocking device which at least partially prevents the gas from penetrating the duct in a closed position.

2 Claims, 1 Drawing Sheet

(56) References Cited

U.S. PATENT DOCUMENTS

| | | | |
|---|---|---|---|
| 6,786,051 B2 * | 9/2004 | Kristich et al. | 60/796 |
| 7,107,774 B2 * | 9/2006 | Radovich | 60/778 |
| 2006/0080971 A1 * | 4/2006 | Smith et al. | 60/797 |
| 2010/0189551 A1 * | 7/2010 | Ballard et al. | 415/175 |

* cited by examiner

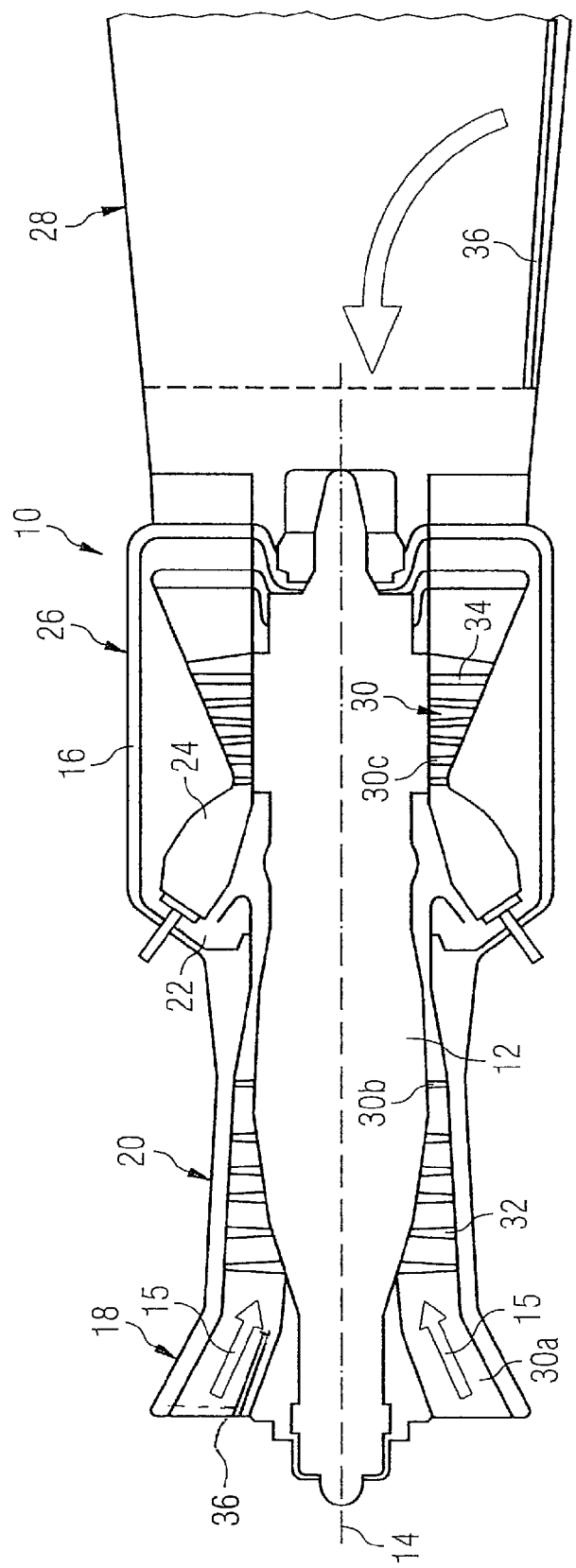

GAS TURBINE FOR A THERMAL POWER PLANT, AND METHOD FOR OPERATING SUCH A GAS TURBINE

CROSS REFERENCE TO RELATED APPLICATIONS

This application is the US National Stage of International Application No. PCT/EP2007/051907, filed Feb. 28, 2007 and claims the benefit thereof. The International Application claims the benefits of European application No. 06005331.1 filed Mar. 15, 2006, both of the applications are incorporated by reference herein in their entirety.

FIELD OF INVENTION

The invention relates to a gas turbine for a thermal power plant, with a rotatable rotor and also a flow passage which can be exposed to throughflow by a gas and in which turbine blades for driving the rotor are arranged. The invention additionally relates to a method for operating such a gas turbine, in which the gas turbine, after completion of a load operation in which a rotor of the gas turbine is driven by a gas via a turbine blade section of the gas turbine, transfers into a deactivated operating state in which the rotor is no longer driven by the gas. A gas turbine for a thermal power plant differs from a steam turbine for such a power plant inter alia by the fact that in the gas turbine the gases in the form of air are first compressed by means of a compressor stage.

BACKGROUND OF THE INVENTION

A generic-type turbine is known for example from GB 1 171 495 A. The turbine in this case is equipped with a partition in the region of the turbine blading, which is radially movable towards the rotor rotational axis in order to adjust the throughput of the mass flow of the working medium during operation of the turbine. A device which is used for the same purpose is known from DE 1 647 673 A. In this case, a ring which is arranged in the axially divided stator blades of a blade ring has a number of openings which corresponds to the number of stator blades. This ring is movable relative to the fixed stator blades in the circumferential direction in order to provide a variable flow cross section for the operating gas by means of a variable overlap of openings of the ring and the free spaces between the stator blades.

The aforementioned gas turbines are flexibly activated or deactivated during operation of the thermal power plant. When "running up" the gas turbine from the deactivated operating state to the load operation a specific load gradient, however, must not be exceeded in order to allow all the components sufficient time to correspondingly warm up in cooperation with the other components. In this way, unacceptably high stresses between the components, which would lead to component failures, are avoided. That is to say, the time period which is required for running up the gas turbine to the load operation must be selected long enough in order to allow sufficient time for the heating-through within the permissible stress states in each case and so as not to cause any damage to the gas turbine.

SUMMARY OF INVENTION

An object forming the basis of the invention is to improve a gas turbine of the type mentioned in the introduction, and also to improve a method of the type mentioned in the introduction, to the effect that the gas turbine can be run up quicker from the deactivated operating state to the load operation without an increased risk of a component failure This object is achieved according to the invention with a generic-type gas turbine which corresponds to the features of the claims. The object according to the invention is additionally achieved with the generic-type method according to the features of the claims.

The gas turbine has an inlet section for inflow of the gas into the gas turbine and an exhaust section through which the gas can be discharged from the gas turbine after flowing through the region with the turbine blades, wherein the blocking device, or the blocking devices, in the closed position at least partially closes off, or close off, the inlet section and/or the exhaust section. During the load operation of the gas turbine, the gas is drawn in from the inlet section in the form of air. Furthermore, the gas is discharged from the exhaust section in the form of an exhaust gas which is produced when combusting a fuel. The inlet section especially has an inlet plenum, while the exhaust section comprises an exhaust duct of the gas turbine.

By means of the provision according to the invention of the blocking device, which in the closed position at least partially closes off the inlet section and/or the exhaust section, a convection flow through the flow passage subsequent to the load operation, which would cool down the components of the gas turbine, is at least partially prevented from being established. As a result, according to the invention the components of the gas turbine can be kept warm for as long as possible after a preceding load operation. This enables the gas turbine to be run up again to the load operation in short time after a limited no-load phase of the gas turbine. By preventing excessive cooling-down of the components of the gas turbine, the temperature difference which is to be bridged can be minimized and therefore the time period which is required for the stress-free heating up of the turbine components to operating temperature can be reduced.

By means of the measure according to the invention, a cooling air draft, during a turning operation of the gas turbine which is executed in the deactivated operating state of the gas turbine, is especially prevented from forming. During the turning operation of the gas turbine, a rotor is driven at a low speed by means of an auxiliary motor for preventing a seizing of the rotor. The air movement which is created as a result of this rotation, in the case of conventional designs of a generic-type gas turbine for a thermal power plant, leads to the gas turbine being cooled in the region of the flow passage and also in regions which lie beneath it. By means of the provision according to the invention of a blocking device, such a convection cooling is prevented from forming.

It is even especially expedient if by means of the closing device a flow cross section of the inlet section or of the exhaust section can be significantly constricted, or can be especially completely closed off. This prevents the exhausting of the residual gas, which is still warm on account of the preceding load operation, from the gas turbine which in turn altogether further delays the cooling-down of the gas turbine.

Furthermore, even the mechanical turning energy can be converted into heat energy so that the gas turbine in the deactivated state cools down even less or even holds its temperature. Furthermore, as a result of the conversion of the mechanical turning energy into heat energy, it can also be brought about that the components of the gas turbine are preheated during initial start-up of the gas turbine. As a result, the gas turbine can be quickly run up even after longer shut-down periods on account of this preheating. By the components of the gas turbine according to the invention remaining at a higher homogeneous temperature level, less stresses occur during the next running-up. This lower stress level then in turn enables the establishing of a higher load gradient by utilizing the maximum permissible stresses within the components. The blocking device can advantageously also be arranged in an open position in the deactivated operating state. In this case, the gas turbine cools down as quickly as possible. This function can be important for example within the scope of an inspection. A further use of the gas turbine according to the invention is that a cooling air draft through a boiler which is connected downstream to the gas turbine is minimized. Therefore, an unwanted cooling down of the boiler is also reduced.

The blocking device in the closed position advantageously at least partially prevents the gas from flowing through the flow passage in the region of the turbine blades. As a result, an excessive cooling down of the components which are arranged in the region of the turbine blades, in which especially high temperatures prevail during the load operation, and especially of the turbine blades, is prevented.

The flowing of the gas through the turbine blade section can be especially effectively prevented if the blocking device has a first blocking element which is arranged in the inlet section, and/or a second blocking element which is arranged in the exhaust section. The blocking elements can be provided especially in the form of plates, flaps, especially pivotable flaps, or other partitions. Corresponding cross sections can be especially simply closed off by means of a pivotable closing flap.

In a furthermore advantageous embodiment, the gas turbine has a combustion chamber which is arranged on the downstream side with regard to the inlet section, in which the gas can be converted from an oxygen-enriched form into an exhaust gas-enriched form, wherein the flow passage extends through the combustion chamber. In particular, the gas on the upstream side of the combustion chamber is present as air, to which fuel is added. This is subsequently combusted in the combustion chamber and the resulting exhaust gas is directed through the blade section of the gas turbine for driving the rotor via turbine blades. If subsequent to the load operation an inlet section which is arranged on the upstream side with regard to the combustion chamber is now at least partially closed off by means of the blocking device, then both the cooling-down of the combustion chamber and of the blade section of the gas turbine is prevented, which brings about a corresponding improvement in the starting behavior of the gas turbine from the deactivated state.

Furthermore, it is advantageous if the gas turbine has a compressor for compressing the gas by means of compressor blades, which is arranged on the downstream side with regard to the inlet section and connected upstream to the combustion chamber, wherein the flow passage extends through the compressor. If the inlet section which is arranged in such a way is now at least partially closed off by means of the blocking device, then a convection cooling of the compressor is also largely prevented, as a result of which a component failure during quick transfer between the deactivated operating state and the load operation can be prevented with greater safety.

An advantageous embodiment of the method according to the invention is characterized in that the exposure of the turbine blade section to throughflow is at least partially prevented by means of an at least partial closing off of an inlet section of the gas turbine, through which the gas flows into the gas turbine during the load operation, and/or an exhaust section through which the gas leaves the gas turbine during the load operation. With an at least partial closing off both of the inlet section and of the exhaust section, a cooling down of the components which are arranged inside the gas turbine can be especially effectively prevented.

Furthermore, it is advantageous if in the deactivated operating state of the gas turbine the rotor, within the limits of a turning operation, is driven at a low speed which prevents a seizing of the rotor. As previously already mentioned, it is advantageous if the rotor, within the limits of the turning operation, is driven at a low speed of for example about 2 Hz, i.e. 2 revolutions per second, by means of an auxiliary motor. By means of the provision of the blocking device according to the invention, the air flow which is produced as a result of the turning operation is retained inside the gas turbine, as a result of which the mechanical turning energy can be converted into heat energy on account of the friction, which is produced by the rotor blades, on the "stationary" air and therefore the components of the gas turbine in the deactivated operating state of the gas turbine can be held at a temperature which is as high as possible. As a result, the gas turbine can be reactivated from the deactivated operating state within an extremely short time.

BRIEF DESCRIPTION OF THE DRAWINGS

An exemplary embodiment of a gas turbine according to the invention is subsequently explained in more detail with reference to the attached schematic drawing.

The single FIGURE of the drawing shows a longitudinal sectional view of an exemplary embodiment of a gas turbine according to the invention.

DETAILED DESCRIPTION OF INVENTION

In the FIGURE, an exemplary embodiment of a gas turbine 10 according to the invention is shown. The gas turbine 10 has a rotor 12 which is rotatably mounted around a rotor axis 14 and is enclosed by a turbine casing 16. At the end of the gas turbine 10 which is situated on the left according to the FIGURE, a gas 15 in the form of air flows via an inlet section 18, which has an inlet plenum, into a compressor 20 which is connected to it. In the region of the compressor 20, the gas 15 which is drawn in by this is compressed by means of compressor blades 32. The compressed air, as gas 15, subsequently reaches a combustion device 22 in which a fuel is added to the compressed air during the load operation. The air/fuel mixture is then ignited in an annular combustion chamber 24. In doing so, the mixture is converted into the form of a hot exhaust gas.

The resulting hot exhaust gas is transmitted into a turbine blade section 26 of the gas turbine 10, in which by expansion it drives the rotor 12 via corresponding turbine blades 34. The exhaust gas subsequently reaches an exhaust section 28 in the form of an exhaust gas duct and from there is directed into a downstream boiler which is not diagrammatically shown. For this reason, the gas turbine 10 has a flow passage 30 for guiding the gas 15 which is present first in the form of air, after that in the form of an air/fuel mixture and finally in the form of an exhaust gas. The flow passage 30, extending from left to right in the FIGURE, comprises an inlet section 30a of the flow passage 30, a compressor section 30b of the flow passage 30, and also a turbine blade section 30c of the flow passage 30, and the combustion chamber 24.

The exhaust section 28 can be closed off by means of a blocking device 36. The blocking device 36 is constructed in the form of a pivotable closing flap. In the figure, the blocking device 36 is shown in the open position. Furthermore, the closed position of the blocking device 36 is shown by a broken line. In one embodiment of a gas turbine according to the invention, the blocking device 36, additionally or alternatively to the closing flap in the exhaust section 28, comprises a corresponding blocking element in the inlet section 18. This blocking element serves for at least partial closing off of the inlet section 18.

The closing flap in the exhaust section and/or further blocking elements are closed after completion of a load operation of the gas turbine 10 in which the rotor 12 is driven by the gas 15 via the turbine blade section 26. In the deactivated operating state of the gas turbine 10, the rotor 12, within the limits of a turning operation, is subsequently driven at a low speed of for example about 2 Hz by means of an auxiliary motor which is not shown. In this way, the rotor 12 is prevented from seizing in the deactivated operating state. As a result of the closing of the blocking device 36 a convection cooling of components of the gas turbine 10 is prevented, which would be established on account of the air flow which is otherwise pumped through by the compressor 20 during the turning operation. Furthermore, the mechanical turning energy can even be converted into heat energy so that the gas turbine 10 is kept warm for as long as possible during shutdown.

The invention claimed is:

1. A method for operating a gas turbine for a thermal power plant, comprising:
    completing a load operation of the gas turbine wherein a rotor of the gas turbine is driven by a gas via a turbine blade section of the gas turbine;
    transferring the gas turbine into a deactivated operating state in which the rotor is no longer driven by the gas; and
    closing off a flow passage of the thermal power plant via a blocking device only during or after the transfer into the deactivated operating state,
    wherein the exposure of the turbine blade section to throughflow is prevented by the closing off of an inlet section of the gas turbine through which the gas flows into the gas turbine during load operation and via a closing off of an exhaust section through which the gas leaves the gas turbine during load operation,
    wherein, in the deactivated operating state of the gas turbine, the rotor is driven at a low speed by an auxiliary motor which prevents a seizing of the rotor.

2. The method as claimed in claim 1, wherein the rotor is driven at a speed of 2 Hz.

* * * * *